(12) United States Patent
Wada et al.

(10) Patent No.: US 8,033,097 B2
(45) Date of Patent: Oct. 11, 2011

(54) EXHAUST CONTROL DEVICE FOR AN INTERNAL COMBUSTION ENGINE

(75) Inventors: Katsuji Wada, Wako (JP); Norio Suzuki, Wako (JP); Tomoko Morita, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 969 days.

(21) Appl. No.: 12/002,209

(22) Filed: Dec. 14, 2007

(65) Prior Publication Data

US 2008/0148712 A1   Jun. 26, 2008

(30) Foreign Application Priority Data

Dec. 15, 2006   (JP) .................. 2006-337698

(51) Int. Cl.
*F01N 3/00* (2006.01)
*F01N 3/10* (2006.01)
(52) U.S. Cl. ............... 60/285; 60/274; 60/276; 60/295; 60/301
(58) Field of Classification Search .................. 60/274, 60/276, 285, 295, 301
See application file for complete search history.

(56) References Cited

U.S. PATENT DOCUMENTS

2006/0130457 A1*  6/2006  Hirowatari et al. ............. 60/276

FOREIGN PATENT DOCUMENTS

| JP | 2002-201985 | 7/2002 |
|---|---|---|
| JP | 2002-266630 | 9/2002 |
| JP | 2006-226219 | 8/2006 |

OTHER PUBLICATIONS

Japanese Office Action for Application No. 2006-337698, dated Apr. 23, 2009.

* cited by examiner

*Primary Examiner* — Thomas Denion
*Assistant Examiner* — Audrey Klasterka
(74) *Attorney, Agent, or Firm* — Nelson Mullins Riley & Scarborough LLP; Anthony A. Laurentano

(57) ABSTRACT

An exhaust control device for an internal combustion engine, comprises: a NOx purifying catalyst disposed in an exhaust system; and a rich control means for calculating a fuel injection amount based on a difference between a target exhaust air fuel ratio and an actual exhaust air fuel ratio to feedback-control the actual exhaust air fuel ratio so that a reducing atmosphere is created in the exhaust system to thereby reduce NOx trapped by the NOx purifying catalyst, wherein the rich control means includes a learning means for calculating and updating a control correction value of the fuel injection amount based on an actual control value of the fuel injection amount during the feedback control, and wherein the fuel injection amount is calculated during the feedback control by using the control correction value.

12 Claims, 7 Drawing Sheets

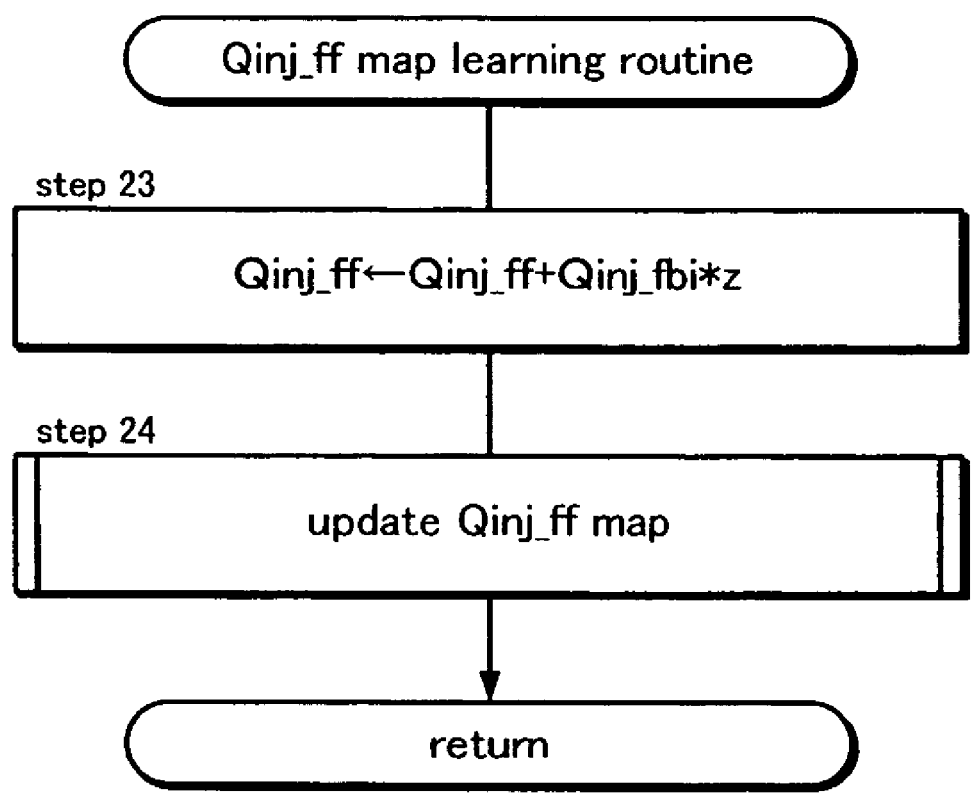

EXHAUST CONTROL DEVICE FOR AN INTERNAL COMBUSTION ENGINE

TECHNICAL FIELD

The present invention relates to an exhaust control device for an internal combustion engine, and particularly relates to an exhaust control device for conducting a regeneration process of a NOx purifying catalyst for decreasing nitrogen oxides in the exhaust gas.

BACKGROUND OF THE INVENTION

The exhaust passage of a diesel engine is sometimes fitted with a lean NOx catalyst (referred to as LNC hereinafter) for reducing and eliminating nitrogen oxides (referred to as NOx hereinafter) in the exhaust gas, where the NOx is particularly generated in a large amount in lean combustion.

The LNC functions to trap (more specifically adsorb) NOx in an oxidizing atmosphere where an exhaust air fuel ratio is higher than a prescribed value (referred to as "lean" hereinafter) and reducing the trapped NOx into a harmless form in a reducing atmosphere where the exhaust air fuel ratio is lower than the prescribed value (referred to as "rich" hereinafter). The NOx purification ability of the LNC tends to decrease as the amount of trapped NOx increases. Therefore, in order to avoid saturation of amount of NOx trapped by the LNC, a process for regenerating the LNC is conducted by executing a rich spike control from time to time to make the exhaust air fuel ratio rich and reduce the NOx trapped by the LNC.

In the rich spike control, the reducing atmosphere is created in the exhaust system by decreasing an amount of air intake by restricting the opening of the intake control valve and/or increasing an amount of exhaust gas recirculation (EGR) than in a usual operation, and at the same time increasing an amount of fuel injection. It is common that the fuel injection amount is feedback-controlled such that an actual value of exhaust air fuel ratio detected by an $O_2$ sensor or the like approaches a target value.

During the rich spike control, in order to shorten the time period from the start of control to the convergence of the exhaust air fuel ratio to the target value, it is conceivable to add, depending on an actual amount of air intake, a predetermined increment of fuel injection (feedforward term) to the current amount of fuel injection, in addition to an increment of fuel injection (feedback term) that is feedback-controlled based on a difference between the target and actual values of exhaust air fuel ratio. The actual amount of air intake may be measured by an air flow meter.

However, because characteristics of some component parts such as the air flow meter, fuel injection valve or the like may differ from one to another and also may change with time, the predetermined value of the feedforward term can be or become inappropriate, and this can result in unsatisfactory control accuracy and response characteristics, which in turn can lead to increased emission in the exhaust gas and lower fuel economy.

In order to cope with such problems and thereby improve the response characteristics in the rich spike control, Japanese Patent Application Laid-Open Publication No. 2002-201985 has proposed to conduct a stoichiometric (referred to as "stoic" hereinafter) combustion at a constant interval and learn a correction value used in the feedback control.

However, in the technique disclosed in JPA 2002-201985, it is necessary to conduct the stoic combustion only for the purpose of learning the correction value and this can deteriorate the fuel economy and/or drive characteristics. Further, the learning is not always possible and requires a certain time period of stationary driving in order to maintain desired control accuracy, and thus the opportunities for learning are inconveniently limited.

BRIEF SUMMARY OF THE INVENTION

The present invention is made to solve such prior art problems, and a primary object of the present invention is to provide an exhaust control device for an internal combustion engine that is provided with a control correction value learning means that can learn an appropriate control correction value without requiring change of the combustion state for the purpose of correction value learning.

To achieve such an object, the present invention provides an exhaust control device for an internal combustion engine, comprising: a NOx purifying catalyst disposed in an exhaust system; and a rich control means for calculating a fuel injection amount based on a difference between a target exhaust air fuel ratio and an actual exhaust air fuel ratio to feedback-control the actual exhaust air fuel ratio so that a reducing atmosphere is created in the exhaust system to thereby reduce NOx trapped by the NOx purifying catalyst, wherein the rich control means includes a learning means for calculating and updating a control correction value of the fuel injection amount based on an actual control value of the fuel injection amount during the feedback control, and wherein the fuel injection amount is calculated during the feedback control by using the control correction value.

According to the above structure of the present invention, every time the feedback control for reducing NOx trapped by the NOx purifying catalyst is conducted, the correction value (or feedforward term) for fuel injection increment control is updated, and therefore, even when the characteristics of the air flow meter and/or fuel injection valve may differ from one to another or may change with time, the correction value can be adjusted to an appropriate value in accordance with such difference and/or change. Therefore, it is possible to allow the exhaust air fuel ratio to rapidly converge to the target value in the feedback control without deteriorating exhaust emission and fuel economy.

Preferably, the rich control means has a combustion rich mode for controlling an amount of main fuel injection and a post rich mode for controlling an amount of post fuel injection that is conducted after combustion, and the learning means comprises a control correction value storing means for storing the control correction value for each of the combustion rich mode and the post rich mode. The combustion rich mode and the post rich mode may require different target air intake amounts and target fuel injection amounts to achieve a same exhaust air fuel ratio for a given operational condition. It should be particularly mentioned that in the post rich mode, the injected fuel flows into the exhaust system as unburnt components irrespective of an amount of fuel injection while in the combustion rich mode, an increase of fuel injection can affect an amount of soot generation, and therefore, the control value should be determined taking into account such differences. The control correction value storing means as above allows different control values to be set for different control modes, and therefore, the fuel injection amount can be optimally controlled in each of the control modes.

Also preferably, the rich control means is provided with a target air fuel ratio storing means for storing the target air fuel ratio that has been predetermined corresponding to operational conditions, the learning means comprises a control correction value storing means for storing the control correction value corresponding to operational conditions, and a data storing point of the target air fuel ratio and a data storing point of the control value correspond to each other for a given operational condition. According to such a structure, it is possible to make a control correction value correspond to each target exhaust air fuel ratio, and therefore, an optimal correction can be made for a selected exhaust air fuel ratio and this can contribute to achieving faster convergence of the air fuel ratio to the target value.

According to another aspect of the present invention, there is provided an exhaust control method for an internal combustion engine provided with a NOx purifying catalyst disposed in an exhaust system, wherein the method comprising the steps of: calculating a fuel injection amount based on a difference between a target exhaust air fuel ratio and an actual exhaust air fuel ratio to feedback-control the actual exhaust air fuel ratio in such a way that a reducing atmosphere is created in the exhaust system to thereby reduce NOx trapped by the NOx purifying catalyst; and calculating and updating a control correction value of the fuel injection amount based on an actual control value of the fuel injection amount during a conduction of the feedback control, wherein the fuel injection amount is calculated during the feedback control by using the control correction value.

According to a further aspect of the present invention, there is provided a computer-readable medium having computer-executable instructions for performing the above method.

BRIEF DESCRIPTION OF THE DRAWINGS

Now the present invention is described in the following with reference to the appended drawings, in which:

FIG. 7 is a flowchart of a subroutine of the control according to the present invention.

DETAILED DESCRIPTION OF THE PREFERRED EMBODIMENTS

Figure 1:
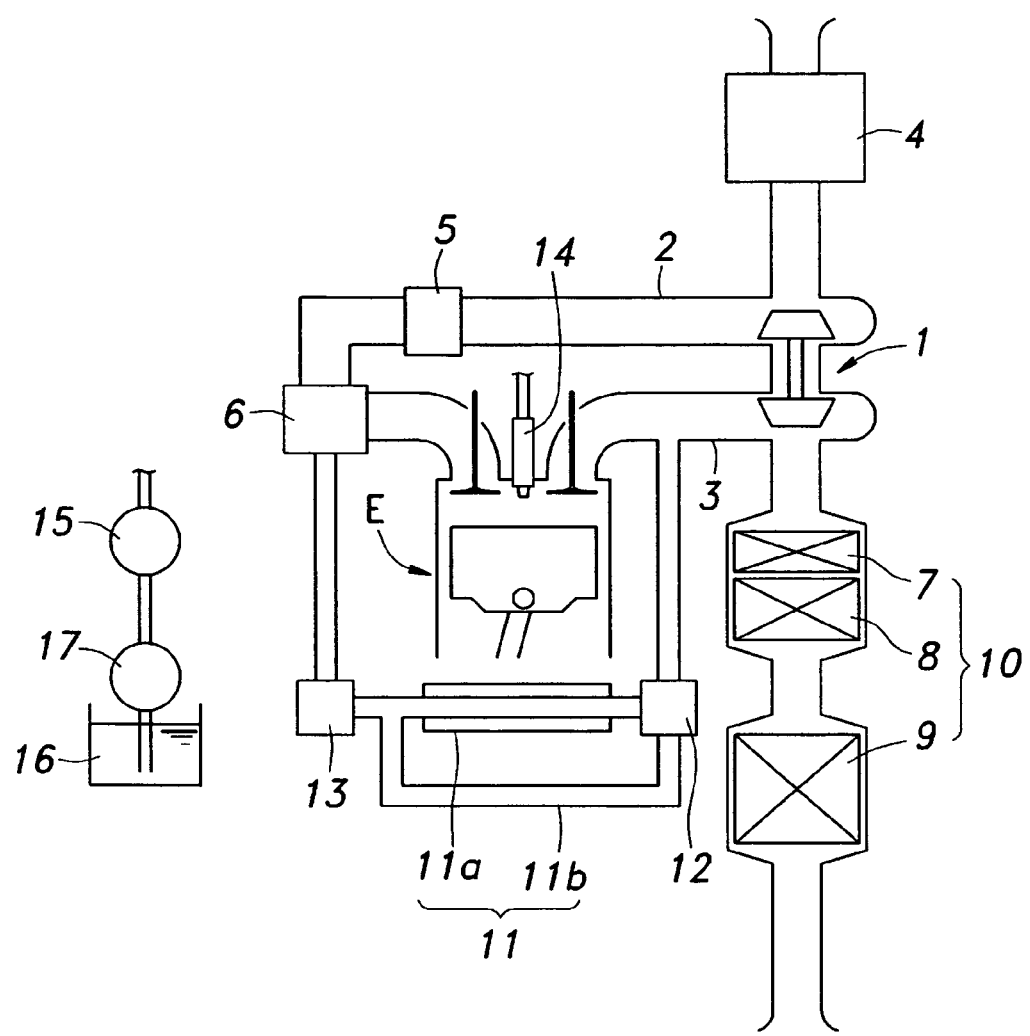
FIG. 1 is an overall structural view of an internal combustion engine to which the present invention is applied.

FIG. 1 is a basic structural view of an internal combustion engine E to which the present invention is applied. The mechanical structure of this internal combustion engine (diesel engine) E is no different from a conventional one, and the engine E comprises a turbocharger 1 equipped with a variable boost pressure mechanism. An intake passage 2 is connected to a compressor side of the turbocharger 1 and an exhaust passage 3 is connected to a turbine side of the turbocharger 1. An air cleaner 4 is connected to an upstream end of the intake passage 2, and an intake control valve 5 for controlling a flow rate of fresh air flowing into a combustion chamber and a swirl control valve 6 for restricting a cross-section of the flow passage to increase the air flow velocity in a low rotational speed/low load operation region are provided at appropriate positions in the intake passage 2. Further, on a downstream end of the exhaust passage 3 is connected an exhaust gas purifying device 10, which comprises a three-way catalyst (referred to as TWC hereinafter ) 7, a filter (DPF) 8 for removing particulate matter such as soot, and an LNC 9, where the TWC 7, filter 8 and LNC 9 are arranged in this order in the direction of exhaust gas flow.

The swirl control valve 6 and a part of the exhaust passage 3 near the exit of the combustion chamber are connected to each other via an exhaust gas recirculating (hereinafter referred to as EGR) passage 11. This EGR passage 11 comprises a cooler passage 11a and a bypass passage 11b which are bifurcated at a switching valve 12, and an EGR control valve 13 is provided at a junction of the passages 11a and 11b for controlling an EGR flow rate toward the combustion chamber.

A fuel injection valve 14 is provided to a cylinder head of the internal combustion engine E such that an end of the fuel injection valve 14 extends into the combustion chamber. The fuel injection valve 14 is connected to a common rail 15 containing fuel at a prescribed high pressure, and the common rail 15 is connected to a fuel pump 17 driven by a crankshaft to pump up fuel from a fuel tank 16.

Figure 2:
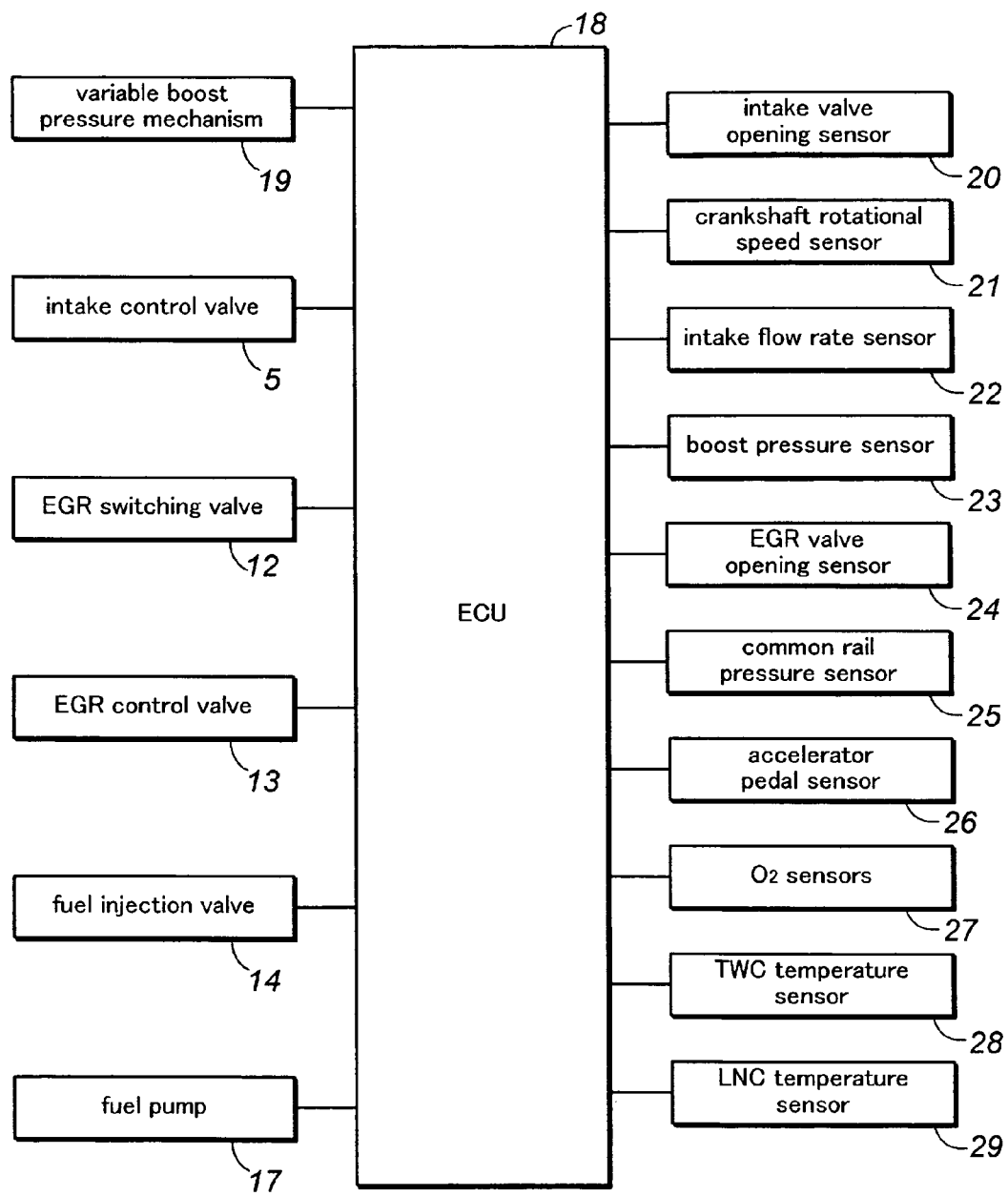
FIG. 2 is a block diagram of a control device to which the present invention is applied.

The variable boost pressure mechanism 19 for the turbocharger 1, the intake control valve 5, EGR passage switching valve 12, EGR control valve 13, fuel injection valve 14, fuel pump 17 and so on are configured to operate according to control signals from an electronic control unit (ECU) 18 (see FIG. 2).

As shown in FIG. 2, the ECU 18 in turn receives signals from an intake valve opening sensor 20, crankshaft rotational speed sensor 21, intake flow rate sensor 22, boost pressure sensor 23, EGR valve opening sensor 24, common rail pressure sensor 25, accelerator pedal sensor 26, $O_2$ sensors 27, TWC temperature sensor 28, LNC temperature sensor 29 and so on which are provided in appropriate parts of the internal combustion engine E.

A memory for ECU 18 stores a map for setting target values of various controlled quantities such as an optimum fuel injection amount that can be typically obtained experimentally with respect to a torque demand (accelerator pedal displacement) and crankshaft rotational speed, so that the various control quantities can be optimally controlled and an optimum combustion state can be achieved for a current operational condition of the internal combustion engine E specified by the torque demand and the crankshaft rotational speed.

Figure 3:
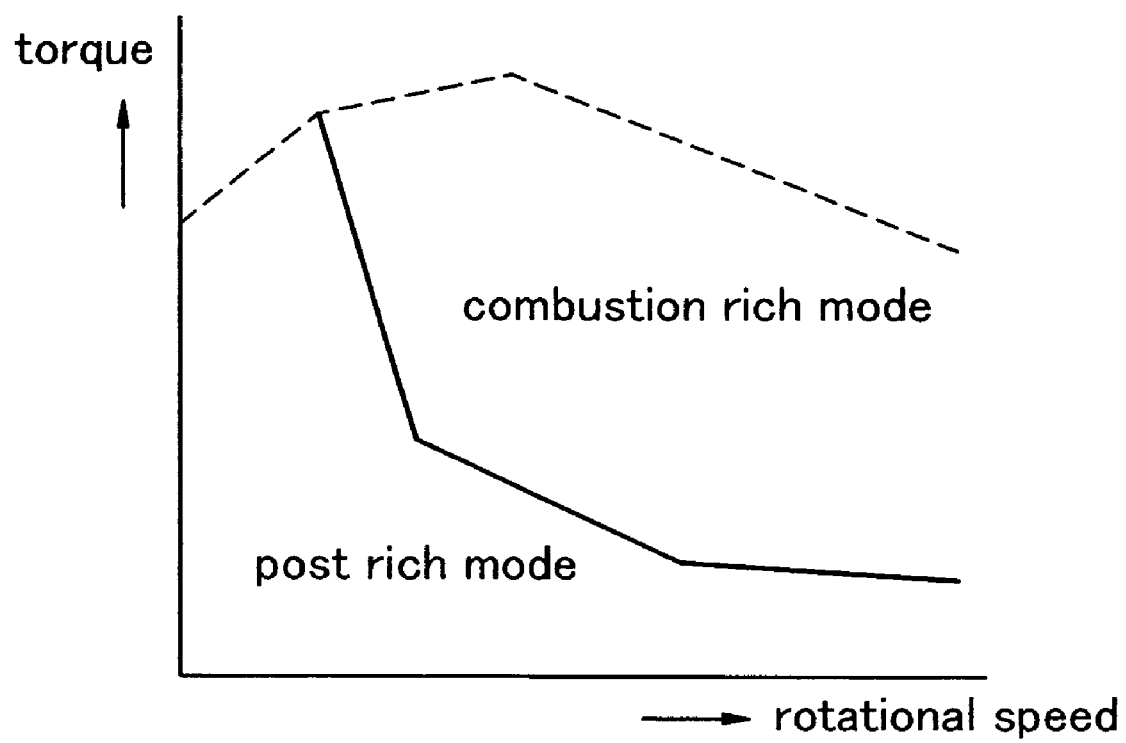
FIG. 3 is a conceptual diagram of a map showing regions for determining a control mode.

In this internal combustion engine E, a regeneration process for reducing NOx trapped by the LNC 9 is conducted from time to time in order to prevent decrease in the NOx purifying ability of the LNC 9. In the regeneration process, the exhaust air fuel ratio is made temporarily rich (rich spike control). In conducting the rich spike control, either of a combustion rich mode, in which a main fuel is increased, or a post rich mode in which supplemental fuel is injected during expansion or exhaust strokes (i.e., after the combustion), is selected depending on operational conditions of the internal combustion engine E by referring to a rich mode region defining map (FIG. 3), which defines regions for selecting the combustion rich mode or post rich mode with respect to the torque demand and crankshaft rotational speed.

Figure 4:
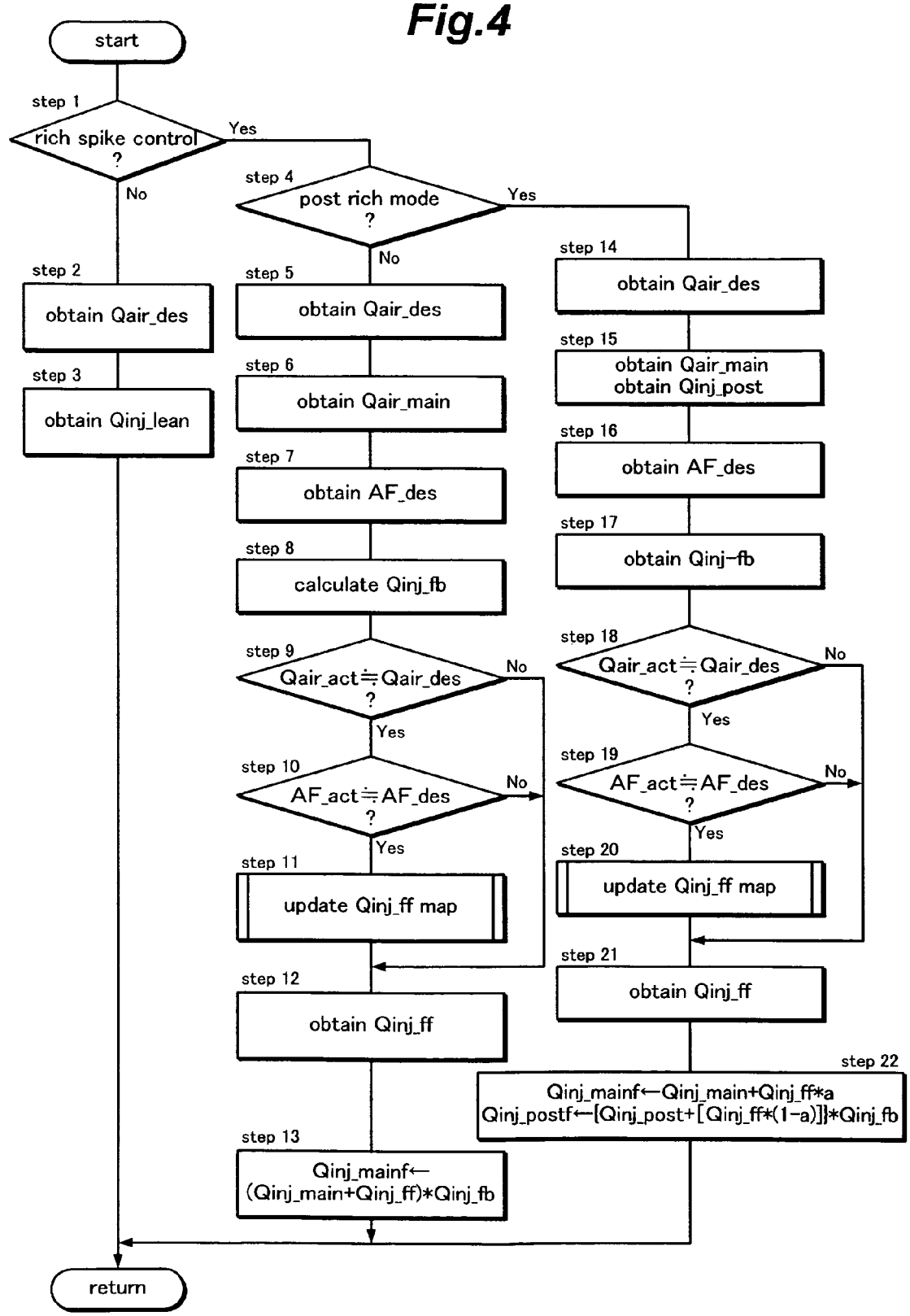
FIG. 4 is a flowchart of a main routine of the control according to the present invention.

Next, an explanation is made to a feedback control of the amount of fuel injection (or exhaust air fuel ratio) with reference to FIG. 4. First, a determination is made on whether the rich spike control is currently conducted or not by referring to a prescribed flag, for example (step 1). As such a flag, it is conceivable to use a flag that is set to 1 (one) when the exhaust air fuel ratio is made rich when an operation has changed from the lean operation to the stoic operation, or a flag that is set to 1 (one) when a sum of an estimated value of an amount of NOx trapped by the LNC 9 during the lean operation and an amount of NOx estimated to be trapped during a reduction rich control has exceeded a prescribed saturation judging value, for example.

When it is determined that the rich spike control is not currently conducted, i.e., that a usual operation is conducted ("NO" in step 1), an air intake amount map for usual operation is accessed to retrieve a target air intake amount Qair_des as a control target value appropriate for the current operational state, where the air intake amount map for usual operation is adapted to be accessed by using the torque demand and the crankshaft rotational speed as an address (step 2).

Further, an access is made to a fuel injection amount map for usual operation to retrieve a target fuel injection amount Qinj_lean as a control target value appropriate for the current operational state, where the fuel injection amount map for usual operation is adapted to be accessed by using the torque demand and the crankshaft rotational speed as an address (step 3)

The intake control valve 5 and the fuel injection valve 14 are controlled so as to achieve the target values of air intake amount and fuel injection amount.

On the other hand, when it is determined in step 1 that the rich spike control is currently conducted ("YES" in step 1), the above described rich mode region defining map (FIG. 3) is accessed to determine whether the current operational condition is in the post rich mode region or not (step 4).

When it is determined that the current operational condition is not in the post rich mode region ("NO" in step 4), i.e., the current operational condition is in the combustion rich mode region, an air intake amount map for combustion rich mode is accessed to retrieve a target air intake amount Qair_des appropriate for the current operational condition, where the air intake amount map for combustion rich mode is adapted to be accessed by using the torque demand and the crankshaft rotational speed as an address (step 5).

Subsequently, an access is made to a main fuel injection amount map for combustion rich mode to retrieve a target main fuel injection amount Qinj_main appropriate for the current operational condition, where the main fuel injection amount map for combustion rich mode is adapted to be accessed by using the torque demand and the crankshaft rotational speed as an address (step 6).

Thereafter, an access is made to an exhaust air fuel ratio map for combustion rich mode to retrieve a target exhaust air fuel ratio AF_des as a control target value appropriate for the current operational condition, where the exhaust air fuel ratio map for combustion rich mode is adapted to be accessed by using the torque demand and the crankshaft rotational speed as an address (step 7).

Then, a fuel injection increment feedback correction coefficient Qinj_fb is calculated (step 8). In the step 8, first, a difference $\Delta AF$ between an actual exhaust air fuel ratio AF_act and the target exhaust air fuel ratio AF_des is obtained ($\Delta AF=AF\_act-AF\_des$). In parallel with this, a new feedback correction proportion term Qinj_fbp for fuel injection amount is obtained by adding a product between an appropriate correction coefficient kp and the difference $\Delta AF$ to the previous feedback correction proportional term Qinj_fbp (Qinj_fbp=Qinj_fbp+$\Delta AF \times kp$). Further, a new feedback correction integral term Qinj_fbi for fuel injection amount is obtained by adding a product between an appropriate correction coefficient ki and the difference $\Delta AF$ to the previous feedback correction integral term Qinj_fbi (Qinj_fbi=Qinj_fbi+$\Delta AF \times ki$). Yet further, a new feedback correction differential term Qinj_fbd for fuel injection amount is obtained by adding a product between an appropriate correction coefficient kd and an amount of change of the difference $\Delta AF$ to the previous feedback correction differential term Qinj_fbd (Qinj_fbd=Qinj_fbd+[$\Delta AF(i)-\Delta AF(i-1)$]$\times kd$).

Thereafter, the feedback correction proportional term Qinj_fbp, feedback correction integral term Qinj_fbi, and feedback correction differential term Qinj_fbd are added together to obtain the fuel injection increment feedback correction coefficient Qinj_fb (Qinj_fb=Qinj_fbp+Qinj_fbi+Qinj_fbd).

Figure 5:
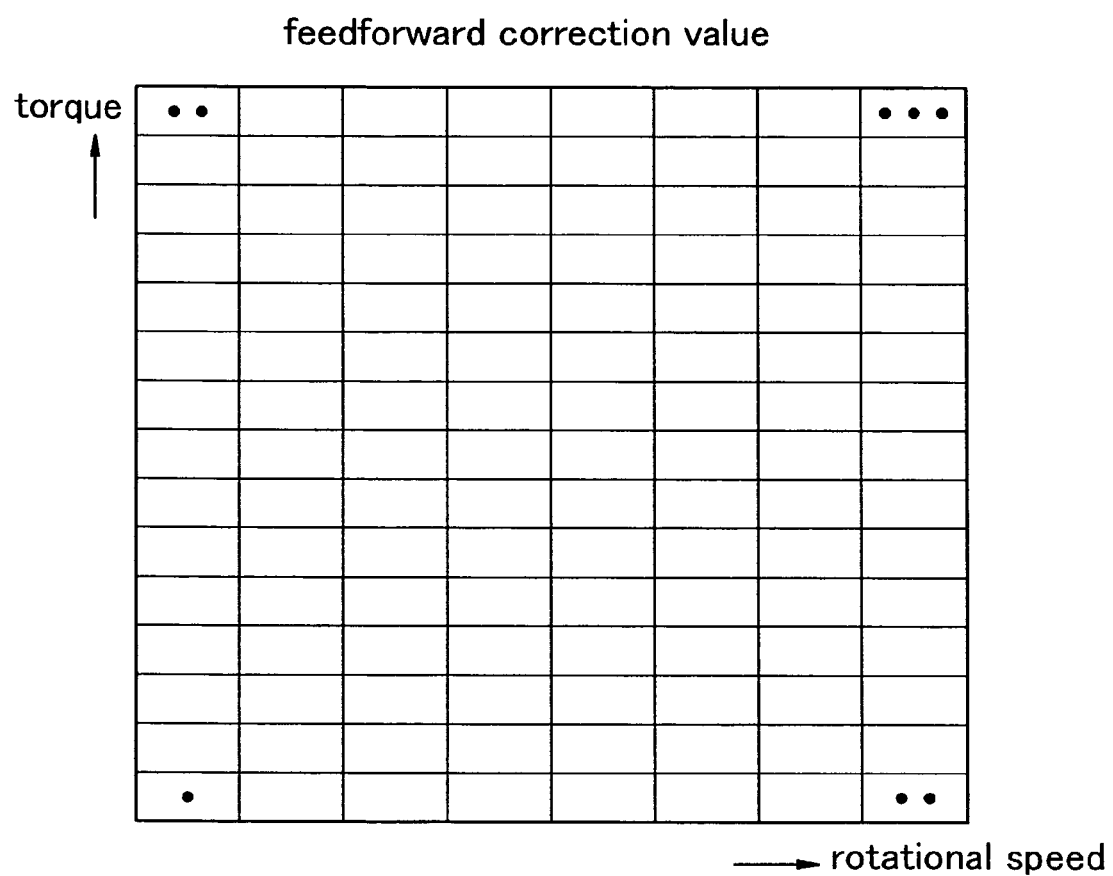
FIG. 5 is a conceptual diagram of a feedforward correction value storing map.

Then, if a difference $\Delta Qair$ between an actual air intake amount $\Delta Qair\_act$ and the target air intake amount Qair_des is equal to or below a prescribed value ("YES" in step 9) and the difference $\Delta AF$ between the actual exhaust air fuel ratio AF_act and the target exhaust air fuel ratio AF_des is equal to or below a prescribed value ("YES" in step 10), i.e., the actual values have converged to the respective target values, an appropriate feedforward correction value Qinj_ff is calculated from the actual fuel injection amount control value at that time, and the thus-calculated feedforward correction value Qinj_ff is used to update a value at a data storing point in a correction value map (FIG. 5) corresponding to the torque demand and the crankshaft rotational speed in the current operational condition, where the correction value map sets and stores the fuel injection increment feedforward correction value Qinj_ff for varying torque demand and crankshaft rotational speed (step 11). In this way, a learning means for maintaining an optimal fuel injection increment feedforward correction value Qinj_ff as a control correction value is configured. A detailed explanation to the learning routine (or how the feedforward correction value Qinj_ff is calculated) in step 11 will be made later.

Thus, the fuel injection increment feedforward correction value Qinj_ff appropriate for the current operational state is obtained from the updated correction value map (FIG. 5) which serves as a control correction value storing means (step 12).

If the determination in step 9 or step 10 results in "NO", i.e., when the actual values have not converged to the target values, the fuel injection increment feedforward correction value Qinj_ff is not updated, and the fuel injection increment feedforward correction value Qinj_ff appropriate for the current operational state is obtained from the unupdated map.

Thereafter, the fuel injection increment feedback correction coefficient Qinj_fb obtained in step 8 is multiplied with a sum between the target main injection amount Qinj_main for combustion rich mode obtained in step 6 and the fuel injection increment feedforward correction value Qinj_ff obtained in step 11, to thereby obtain a final main injection amount Qinj_mainf for combustion rich mode (step 13).

Thus, the fuel injection increment feedforward correction value Qinj_ff, which serves as a control correction value used in calculating the final main injection amount Qinj_mainf, is updated when the actual air fuel ratio AF_act has converged to the target air fuel ratio AF_des during the feedback control for the rich spike control, and the updated feedforward correction value Qinj_ff is stored in the map therefor. In a subsequent feedback control for the rich spike control, the Qinj_ff updated in the previous feedback control can be used from the beginning of the feedback control to calculate an appropriate final main injection amount Qinj_mainf, and therefore, the air fuel ratio AF_act can converge to the target value AF_des faster.

On the other hand, if it is determined in step 4 that the current condition is in the post rich mode region ("YES" in step 4), an air intake amount map for post rich mode is accessed to retrieve a target air intake amount Qair_des for post rich mode appropriate for the current operational condition, where the air intake amount map for post rich mode is adapted to be accessed by using the torque demand and the crankshaft rotational speed as an address (step 14).

Subsequently, an access is made to a main fuel injection amount map for post rich mode to retrieve a target main fuel injection amount Qinj_main for post rich mode appropriate for the current operational condition, and an access is also made to a post fuel injection amount map to retrieve a target post fuel injection amount Qinj_post for post rich mode appropriate for the current operational condition, where the main fuel injection amount map for post rich mode and the post fuel injection amount map are adapted to be accessed by using the torque demand and the crankshaft rotational speed as an address (step 15).

Thereafter, an access is made to an exhaust air fuel ratio map for post rich mode to retrieve a target exhaust air fuel ratio AF_des for post rich mode as a control target value appropriate for the current operational condition, where the exhaust air fuel ratio map for post rich mode is adapted to be accessed by using the torque demand and the crankshaft rotational speed as an address (step 16).

Then, in the same fashion as in step 8, a fuel injection increment feedback correction coefficient Qinj_fb is calculated (step 17).

If a difference ΔQair between an actual air intake amount ΔQair_act and the target air intake amount Qair_des is equal to or below a prescribed value ("YES" in step 18) and the difference ΔAF between the actual exhaust air fuel ratio AF_act and the target exhaust air fuel ratio AF_des is equal to or below a prescribed value ("YES" in step 19), i.e., the actual values have converged to their respective target values, an appropriate feedforward correction value Qinj_ff is calculated from the actual fuel injection amount control value at that time, and the thus-calculated feedforward correction value Qinj_ff is used to update a value at a data storing point in a correction value map (FIG. 5) corresponding to the torque demand and the crankshaft rotational speed in the current operational state, where the correction value map (FIG. 5) sets and stores the fuel injection increment feedforward correction value Qinj_ff corresponding to the torque demand and the crankshaft rotational speed (step 20), and the fuel injection increment feedforward correction value Qinj_ff appropriate for the current operational condition is obtained from the updated correction value map (step 21). It should be mentioned that the learning routine in step 20 is the same as that for the map for main fuel injection (step 11).

If the determination in step 18 or step 19 results in "NO", i.e., when the actual values have not converged to the target values, the fuel injection increment feedforward correction value Qinj_ff is not updated, and the fuel injection increment feedforward correction value Qinj_ff appropriate for the current operational state is obtained from the map before updating.

Thereafter, the target main injection amount Qinj_main for post rich mode obtained in step 15 is added to a product between the fuel injection increment feedforward correction value Qinj_ff obtained in step 21 and a weighting coefficient a (a value from 0 (zero) to 1 (one)), which may be experimentally obtained beforehand, to obtain a final main injection amount Qinj_mainf for post rich mode. At the same time, the target post fuel injection amount Qinj_post for post rich mode obtained in step 15 is added to a product between the fuel injection increment feedforward correction value Qinj_ff obtained in step 21 and (1−a), and then multiply the sum by the fuel injection increment feedback correction coefficient Qinj_fb obtained in step 17 to thereby obtain a final post fuel injection amount Qinj_postf for post rich mode (step 22). In this way, the post fuel injection amount added to the main fuel injection amount is determined. In general, in a low rotational speed/low load region, a large change in the main fuel injection amount can lead to a large torque fluctuation, and therefore, the exhaust air fuel ratio is preferably controlled only by controlling the post fuel injection amount.

Figure 6:
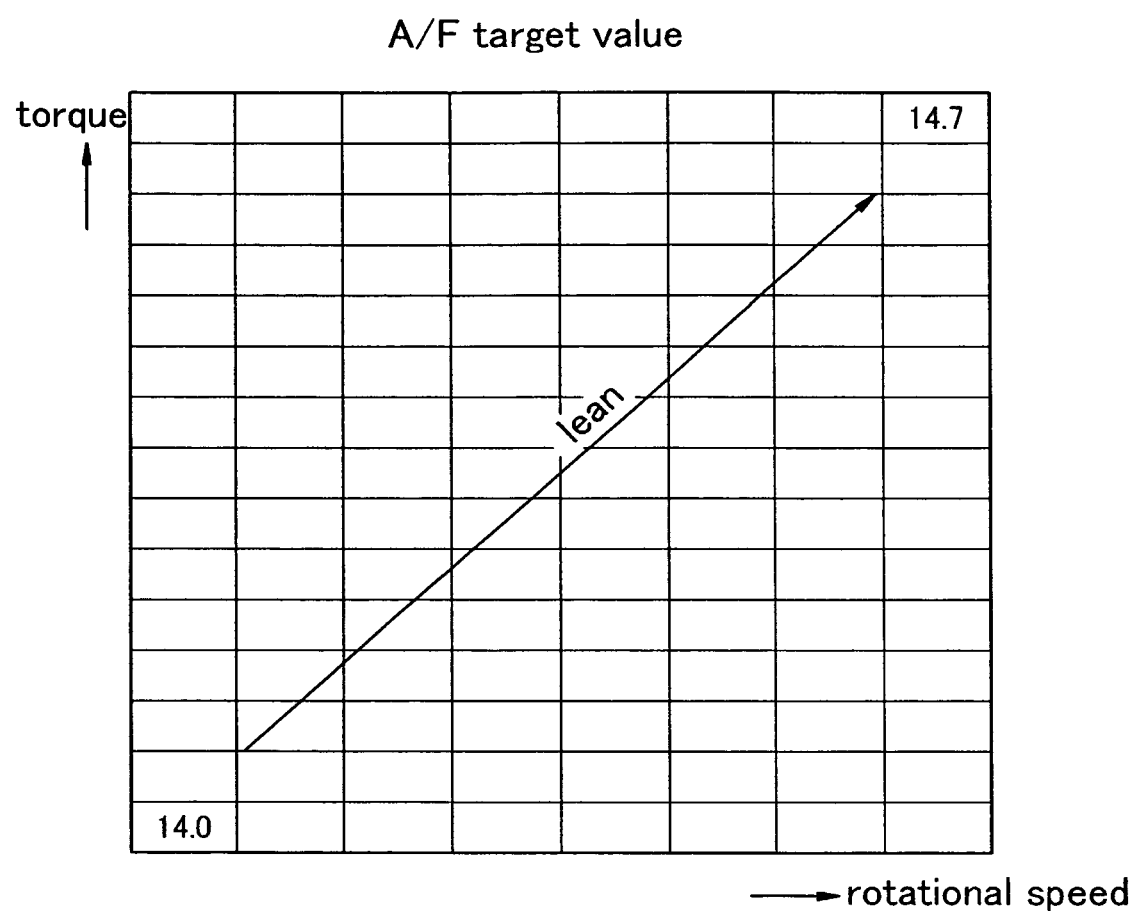
FIG. 6 is a conceptual diagram of an air fuel ratio target value storing map.

It should be noted that the target exhaust air fuel ratio for rich spice control can be experimentally obtained for varying operational conditions beforehand and stored in a data map, and this data map sets a leaner target air fuel ratio for a higher speed and higher load, as shown in FIG. 6. This is to suppress generation of soot which tends to be produced in a larger amount for a higher speed and load.

Further, for a same load region, the target exhaust air fuel ratio is leaner in the post rich mode than in the combustion rich mode. This is because the fuel amount should be slightly decreased in the post rich mode taking into consideration that the fuel economy tends to be lowered in the post rich mode.

Next, with reference to FIG. 7, an explanation is made to the learning routine of the fuel injection increment feedforward correction value map.

First, a product between the current feedback correction integral term Qinj_fbi and an averaging coefficient z is added to the previous fuel injection increment feedforward correction value Qinj_ff to obtain a new fuel injection increment feedforward correction value Qinj_ff (step 23). Then, the new fuel injection increment feedforward correction value is used to update a value at a data storing point corresponding to the current torque demand and crankshaft rotational speed in the fuel injection increment feedforward correction value map (step 24).

According to the embodiment of the present invention, the map storing the feedforward correction values (FIG. 5) and the map storing the target air fuel ratios (FIG. 6) have the same number of discrete data storing points that can be specified by the torque demand and the crankshaft rotational speed. Therefore, there is a one-to-one relationship between the target air fuel ratio and the correction value which can vary for different operational conditions, and their resolutions are the same. By thus making a correction value completely correspond to the target air fuel ratio for each operational condition, even when the air fuel ratio is set with a high resolution for varying operational states, a correction value most appropriate for the current target air fuel ratio can be used and the data storing point of a correction value used for a target air fuel ratio at a certain data storing point can be always the same, and therefore, a favorable control accuracy can be achieved.

As described above, according to the present invention, the feedforward control correction value is updated based on the control value (correction integral term) of the fuel injection amount up to when the air fuel ratio has converged to the target value in the previous feedback control, and the control target value of the fuel injection amount is calculated by using the updated control correction value. Therefore, even when the characteristics of component parts such as the air flow meter or fuel injection valve may vary from one to another or change with time, an appropriate feedforward control value can be always obtained. Thus, it is possible to ensure desirable control accuracy and response characteristics to be achieved and prevent deteriorated exhaust gas emission and fuel consumption efficiency.

Although the present invention has been described in terms of preferred embodiments thereof, it is obvious to a person skilled in the art that various alterations and modifications are possible without departing from the scope of the present invention which is set forth in the appended claims.

The disclosure of the original Japanese patent application (Japanese Patent Application No. 2006-337698 filed on Dec. 15, 2006) on which the Paris Convention priority claim is made for the present application is hereby incorporated by reference in its entirety.

The invention claimed is:

1. An exhaust control device for an internal combustion engine, comprising:
   a NOx purifying catalyst disposed in an exhaust system; and
   a rich control means for calculating a fuel injection amount based on a difference between a target exhaust air fuel ratio and an actual exhaust air fuel ratio to feedback-control the actual exhaust air fuel ratio so that a reducing atmosphere is created in the exhaust system to thereby reduce NOx trapped by the NOx purifying catalyst,
   wherein the rich control means includes a learning means for calculating and updating a control correction value of the fuel injection amount based on an actual control value of the fuel injection amount during the feedback control,
   wherein the fuel injection amount is calculated during the feedback control by using the control correction value,
   wherein the rich control means has a combustion rich mode for controlling an amount of main fuel injection and a post rich mode for controlling an amount of post fuel injection that is conducted after combustion,
   wherein the learning means comprises a control correction value storing means for storing the control correction value for each of the combustion rich mode and the post rich mode.

2. The exhaust control device for an internal combustion engine according to claim 1, wherein:
   the rich control means is provided with a target air fuel ratio storing means for storing the target air fuel ratio that has been predetermined corresponding to operational conditions;
   the learning means comprises a control correction value storing means for storing the control correction value corresponding to operational conditions; and
   a data storing point of the target air fuel ratio and a data storing point of the control value correspond to each other for a given operational condition.

3. The exhaust control device for an internal combustion engine according to claim 1, wherein the control correction value of the fuel injection amount consists of a feedforward correction value of the fuel injection amount.

4. The exhaust control device for an internal combustion engine according to claim 1, wherein at least at a beginning of the feedback control, the fuel injection amount is calculated by using the control correction value calculated and updated during a previous feedback control.

5. An exhaust control method for an internal combustion engine provided with a NOx purifying catalyst disposed in an exhaust system, wherein the method comprises the steps of:
   calculating a fuel injection amount based on a difference between a target exhaust air fuel ratio and an actual exhaust air fuel ratio to feedback-control the actual exhaust air fuel ratio in such a way that a reducing atmosphere is created in the exhaust system to thereby reduce NOx trapped by the NOx purifying catalyst; and
   calculating and updating a control correction value of the fuel injection amount based on an actual control value of the fuel injection amount during a conduction of the feedback control,
   wherein the fuel injection amount is calculated during the feedback control by using the control correction value,
   wherein the step of calculating a fuel injection amount comprises a step of selecting either of a combustion rich mode for controlling an amount of main fuel injection or a post rich mode for controlling an amount of post fuel injection that is conducted after combustion,
   wherein the step of calculating and updating a control correction value comprises a step of storing the control correction value for the combustion rich mode and a step of storing the control correction value for the post rich mode.

6. The exhaust control method according to claim 5, further comprising the steps of:
   storing the target air fuel ratio that has been predetermined corresponding to operational conditions in a target air fuel ratio storing means; and
   storing the control correction value corresponding to operational conditions in a control correction value storing means,
   wherein a data storing point of the target air fuel ratio and a data storing point of the control value correspond to each other for a given operational condition.

7. The exhaust control method according to claim 5, wherein the control correction value of the fuel injection amount consists of a feedforward correction value of the fuel injection amount.

8. The exhaust control method according to claim 5, wherein at least at a beginning of the feedback control, the fuel injection amount is calculated by using the control correction value calculated and updated during a previous feedback control.

9. A computer-readable medium having computer-executable instructions for performing an exhaust control method for an internal combustion engine provided with a NOx purifying catalyst disposed in an exhaust system, wherein the method comprises the steps of:
   calculating a fuel injection amount based on a difference between a target exhaust air fuel ratio and an actual exhaust air fuel ratio to feedback-control the actual exhaust air fuel ratio in such a way that a reducing atmosphere is created in the exhaust system to thereby reduce NOx trapped by the NOx purifying catalyst; and
   calculating and updating a control correction value of the fuel injection amount based on an actual control value of the fuel injection amount during a conduction of the feedback control,
   wherein the fuel injection amount is calculated during the feedback control by using the control correction value,
   wherein the step of calculating a fuel injection amount comprises a step of selecting either of a combustion rich mode for controlling an amount of main fuel injection or a post rich mode for controlling an amount of post fuel injection that is conducted after combustion,
   wherein the step of calculating and updating a control correction value comprises a step of storing the control correction value for the combustion rich mode and a step of storing the control correction value for the post rich mode.

10. The computer-readable medium according to claim 9, wherein the method further comprises the steps of:
    storing the target air fuel ratio that has been predetermined corresponding to operational conditions in a target air fuel ratio storing means; and
    storing the control correction value corresponding to operational conditions in a control correction value storing means, wherein a data storing point of the target air fuel ratio and a data storing point of the control value correspond to each other for a given operational condition.

11. The computer-readable medium according to claim 9, wherein the control correction value of the fuel injection amount consists of a feedforward correction value of the fuel injection amount.

12. The computer-readable medium according to claim 9, wherein at least at a beginning of the feedback control, the fuel injection amount is calculated by using the control correction value calculated and updated during a previous feedback control.

* * * * *